US007301908B2

(12) United States Patent
Carroll

(10) Patent No.: US 7,301,908 B2
(45) Date of Patent: Nov. 27, 2007

(54) METHOD AND APPARATUS FOR RESCHEDULING A COMMUNICATION SYSTEM CHANNEL AFTER A CHANNEL PROPERTY CHANGE

(75) Inventor: Martin D. Carroll, Watchung, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 996 days.

(21) Appl. No.: 10/391,982

(22) Filed: Mar. 19, 2003

(65) Prior Publication Data

US 2004/0184472 A1  Sep. 23, 2004

(51) Int. Cl.
*H04B 7/212* (2006.01)

(52) U.S. Cl. .................. 370/236; 370/437; 370/443; 370/458; 370/462; 725/146

(58) Field of Classification Search .............. 370/235, 370/236, 442, 443
See application file for complete search history.

(56) References Cited

U.S. PATENT DOCUMENTS

| | | | | |
|---|---|---|---|---|
| 5,852,630 | A * | 12/1998 | Langberg et al. ............ 375/219 |
| 6,185,224 | B1 * | 2/2001 | Limb et al. .................. 370/459 |
| 6,442,158 | B1 * | 8/2002 | Beser .......................... 370/352 |
| 6,754,225 | B1 * | 6/2004 | Lin et al. ..................... 370/442 |
| 6,804,251 | B1 * | 10/2004 | Limb et al. .................. 370/444 |
| 6,950,399 | B1 * | 9/2005 | Bushmitch et al. .......... 370/236 |
| 6,987,754 | B2 * | 1/2006 | Shahar et al. ................ 370/349 |
| 7,023,871 | B2 * | 4/2006 | Lind et al. ................... 370/437 |
| 7,024,680 | B2 * | 4/2006 | Howard ....................... 725/107 |
| 7,035,285 | B2 * | 4/2006 | Holloway et al. ........... 370/474 |
| 7,075,934 | B2 * | 7/2006 | Chiussi et al. ........... 370/395.41 |
| 7,139,283 | B2 * | 11/2006 | Quigley et al. .............. 370/432 |
| 7,161,945 | B1 * | 1/2007 | Cummings .................. 370/401 |

OTHER PUBLICATIONS

Yin, Wu, and Lin, "Two-phase Minislot Scheduling Algorithm for HFC QoS Services Provisioning", Nov. 25-29, 2001, IEEE GLOBECOM '01, p. 410-414.*
Cable Television Laboratories, "Data-Over-Cable Service Interface Specifications: Radio Frequency Interface Specification, SP-RFIv1.1-I07-010829", Seventh Interim Release, Aug. 29, 2001.*
A. Colmenares et al., "Determination of the Capacity of the Upstream Channel in Cable Networks," http://citeseer.nj.nec.com/405521.html, pp. 1-12, undated.
G. Kramer et al., "Ethernet Passive Optical Network (EPON): Building a Next-Generation Optical Access Network," IEEE Communications Magazine, pp. 66-73, Feb. 2002.
Y-D. Lin et al., "An Investigation into HFC MAC Protocols: Mechanisms, Implementation, and Research Issues," IEEE Communications Surveys, http://www.comsoc.org/pubs/surveys, pp. 2-13, 2000.
W-M. Yin et al., "Two-Phase Minislot Scheduling Algorithm for HFC QoS Services Provisioning," IEICE Trans. Commun., vol. E85-B, No. 3, pp. 582-593, Mar. 2002.

* cited by examiner

*Primary Examiner*—Hassan Kizou
*Assistant Examiner*—Brian T O'Connor

(57) ABSTRACT

Techniques for rescheduling one or more timing intervals associated with a channel of a communication system. Responsive to a detected change in a property of the channel, a rescheduling algorithm identifies a given one of the timing intervals, within a schedule for the channel, that violates a system requirement in view of the detected change. The algorithm determines if the interval can be rescheduled to accommodate the detected change and if so reschedules the interval. If the interval cannot be rescheduled to accommodate the detected change, the interval is removed from the schedule. The rescheduling process may be repeated for each of the intervals in the channel schedule. The intervals in an illustrative embodiment may include, for example, grants, polls, free intervals or initial-maintenance intervals (IMIs) of an upstream channel in a DOCSIS-compliant CATV system.

19 Claims, 11 Drawing Sheets

```
generateMAP (u, t)
1.      n = selectN (u, t)
2.      advanceM (u, n)
3.      initializeMAPFromSchedule (u, n)
4.      finishMAP (u)
```

FIG. 7

|  | REQUIRES GRANTS? | REQUIRES POLLS? |
|---|---|---|
| BEST EFFORT | WHEN REQUESTED | WHEN APPROPRIATE |
| rtPS | WHEN REQUESTED | PERIODICALLY |
| nrtPS | WHEN REQUESTED | PERIODICALLY |
| UGS | PERIODICALLY | NEVER |
| UGS/AD | PERIODICALLY, WHEN ACTIVE | PERIODICALLY, WHEN INACTIVE |

FIG. 8

|  | GRANTS IN SCHEDULE? | POLLS IN SCHEDULE? |
|---|---|---|
| BEST EFFORT | MAYBE | MAYBE |
| rtPS | MAYBE | YES |
| nrtPS | MAYBE | YES |
| UGS | YES | NO |
| UGS/AD | YES | YES |

FIG. 9

|  | GRANT REMOVAL VIOLATES QoS? | POLL REMOVAL VIOLATES QoS? |
|---|---|---|
| BEST EFFORT | NO | NO |
| rtPS | NO | YES |
| nrtPS | NO | YES |
| UGS | YES | --- |
| UGS/AD | YES | YES |

FIG. 10

1. for each interval x in the schedule, starting from the interval containing M
2.   try to fix x
3.   if x cannot be fixed
4.     remove x
5.     if x is a grant or poll for a non-best-effort flow
6.       deadmit the flow

FIG. 12A
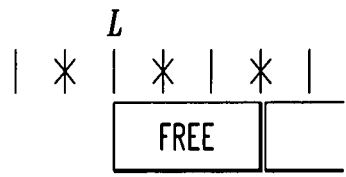
FIG. 12B
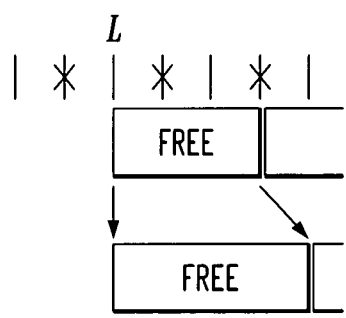
FIG. 13
1. remove all IMIs from the schedule
2. reschedule everything other than IMIs
3. add IMIs back into the schedule
FIG. 14
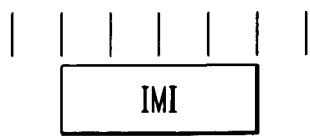

FIG. 15 reschedule (u, Δ)
1. if not isLegal(u, Δ)
2.     return error
3. D = fixSchedule(u, Δ)
4. for each flow f in D
5.     deadmit f

FIG. 16 isLegal (u, Δ)
1. if Δ changes the channel ID
2.     return false
3. if Δ does not change the configuration-change count
4.     return false
5. if u is IMI aligned
6.     if Δ changes the frequency, symbol rate, or burst descriptor for IMIs
7.         return false
8.     if Δ changes μ
9.         for each IMI x in the schedule
10.             if not isSlotAlignedAfter (x, Δ)
11.                 return false
12. return true

FIG. 17 isSlotAlignedAfter (x, Δ)
1. curScale = $\mu_{cur}/\mu_{min}$
2. newScale = $\mu_{new}/\mu_{min}$
3. s = ( number of minislots from M to x ) * curScale
5. if s mod newScale != 0
6.     return false
7. t = nslots[x] * curScale
8. if t mod newScale != 0
9.     return false
10. return true

FIG. 18

| | fixSchedule (u, Δ) |
|---|---|
| 1. | if u is not IMI aligned |
| 2. | remove all IMIs from schedule |
| 3. | cut the schedule at the left of M |
| 4. | convertToUMin (u) |
| 5. | D = ∅ |
| 6. | x = MI |
| 7. | while x != nil |
| 8. | x = fixInterval (x, Δ, D) |
| 9. | convertToUNew (u, Δ) |
| 10. | rejoin the schedule |
| 11. | if u is not IMI aligned and the CMTS does in-schedule IMIs |
| 12. | reschedule IMIs |
| 13. | return D |

FIG. 19

| | convertToUMin (u) |
|---|---|
| 1. | scale = $\mu_{cur}/\mu_{min}$ |
| 2. | for each interval x starting at m |
| 3. | nslots[x] = nslots[x] * scale |
| 4. | if x == m |
| 5. | offset[x] = 0 |
| 6. | else |
| 7. | p = pred[x] |
| 8. | offset[x] = offset[p] + nslots[p] |

FIG. 20

| | convertToUNew (u, Δ) |
|---|---|
| 1. | scale = $\mu_{new}/\mu_{min}$ |
| 2. | for each interval x starting at m |
| 3. | nslots[x] = nslots[x] / scale |
| 4. | if x == m |
| 5. | offset[x] = 0 |
| 6. | else |
| 7. | p = pred[x] |
| 8. | offset[x] = offset[p] + nslots[p] |

FIG. 21

```
fixInterval (x, Δ, D)
1.    if type[x] == free
2.        return fixFreeInterval (x, Δ)
3.    if type[x] == grant or poll
4.        return fixGrantOrPoll (x, Δ, D)
5.    if type[x] == IMI
6.        return succ[x]
7.    makeFree (x)
8.    return fixFreeInterval (x, Δ)
```

FIG. 22

```
fixFreeInterval (x, Δ)
1.    totNeed = nAdditionalUMinNeededToSlotAlign(x, Δ)
2.    stillNeed = totNeed
3.    y = succ[x]
4.    while stillNeed > 0
5.        assert y != nil
6.        n = min(stillNeed, nslots[y])
7.        nslots[x] = nslots[x] + n
8.        nslots[y] = nslots[y] - n
9.        offset[y] = offset[y] + totNeed
10.       stillNeed = stillNeed - n
11.       y = succ[y]
12.   ret = succ[x]
13.   if nslots[x] == 0
14.       remove x from schedule
15.   return ret
```

FIG. 23  NEW MINISLOT BOUNDARIES

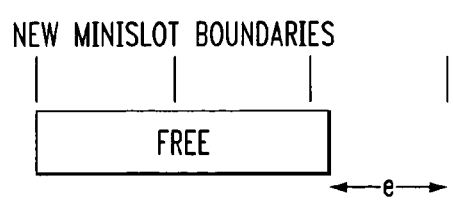

FIG. 24

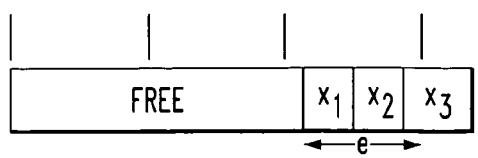

FIG. 25

```
nAdditionalUMinNeededToSlotAlign (x, Δ)
1.    scale = μ_new/μ_min
2.    r = nslots[x] mod scale
3.    if r == 0
4.        return 0
5.    return scale - r
```

FIG. 26

```
fixGrantOrPoll (x, Δ, D)
1.    f = flow[x]
2.    if f ∈ D
3.        makeFree (x)
4.        return fixFreeInterval (x, Δ)
5.    n = newSize (x, f, Δ)
6.    if n < nslots[x]
7.        shrink (x, n)
8.        return succ[x]
9.    if n > nslots[x]
10.       if removalViolatesQoS (x, f)
11.           add f to D
12.       makeFree[x]
13.       return fixFreeInterveral (x, Δ)
```

FIG. 27

```
newSize (x, f, Δ)
1.    if type[x] == grant
2.        return size, in μ_min, of grant for f after Δ
3.    else
4.        return size, in μ_min, of poll after Δ
```

FIG. 28 removalViolatesQoS (x, f)
1.      if type[x] == grant
2.          return type[f] == UGS or UGS/AD
3.          return type [f] == UGS/AD, rtPS, or nrtPS

FIG. 29 shrink (x, n)
1.      m = nslots[x] - n
2.      nslots[x] = nslots[x] - m
3.      y = succ[x]
4.      if y != nil and type[y] == free
5.          nslots[y] = nslots[y] + m
6.          offset[y] = offset[y] - m
7.      else
8.          y = new free interval
9.          nslots[y] = m
10.     offset[y] = offset[x] + nslots[x]
11.     insert y after x

FIG. 30 makeFree (x)
1.      type[x] = free
2.      y = pred[x]
3.      if y != nil and type[y] == free
4.          offset[x] = offset[y]
5.          nslots[x] = nslots[x] + nslots[y]
6.          remove y from schedule
7.      y = succ[x]
8.      if y != nil and type[y] == free
10.     nslots[x] = nslots[x] + nslots[y]
11.     remove y from schedule

METHOD AND APPARATUS FOR RESCHEDULING A COMMUNICATION SYSTEM CHANNEL AFTER A CHANNEL PROPERTY CHANGE

FIELD OF THE INVENTION

The present invention relates generally to communication systems, and more particularly to channel scheduling techniques for use in such systems.

BACKGROUND OF THE INVENTION

In many communication system applications, communication channel properties such as slot size and modulation characteristics can be varied dynamically during system operation. It is important that these channel property changes be taken into account in the scheduling of data transmissions over the channel. One application in which such issues arise is in the scheduling of an upstream data transmission channel in a cable television system, also commonly referred to as a community access television (CATV) system, as will be described below.

In a CATV system, cable modems (CMs) communicate with a cable-modem termination system (CMTS) over a CATV network. The cable-industry-backed standard that specifies how a CM and CMTS communicate with each other is called DOCSIS (Data Over Cable Service Interface Specification), and is described in the DOCSIS specification documents, which are incorporated by reference herein.

A DOCSIS-compliant network is frequency-division multiplexed (FDM) into one or more downstream (CMTS-to-CM) and one or more upstream (CM-to-CMTS) channels, with each channel corresponding to one FDM frequency. Data sent on a downstream channel is physically broadcast to all CMs that can receive that channel, and each CM picks off the packets that are intended for that CM. During normal operation a CM listens on only one downstream channel and transmits on only one upstream channel. CMs cannot directly communicate with each other. All data sent on a given upstream channel goes to the CMTS serving that channel. A typical CMTS serves between about 500 and 2,000 CMs.

In order to maximize the throughput of an upstream channel, a CMTS will typically want to change the properties of that channel when, for example, the channel becomes less noisy. Hence, DOCSIS provides a simple mechanism that lets the CMTS change the properties of an upstream channel at any time.

Although the DOCSIS protocol for changing upstream properties is simple, the internal CMTS ramifications are not. Often, a property change causes the current upstream schedule to become illegal, in which case the CMTS must reschedule the upstream. However, DOCSIS does not disclose or suggest any particular techniques by which a CMTS might provide such rescheduling.

A need therefore exists for techniques for performing rescheduling operations in cable-modem upstream channels in a CATV system, as well as in other communication system applications.

SUMMARY OF THE INVENTION

The present invention provides techniques for rescheduling a channel of a communication system after a change in a property of that channel.

In accordance with one aspect of the invention, a rescheduling algorithm, responsive to a detected change in a property of the channel, identifies a given timing interval within a schedule for the channel that violates a system requirement in view of the detected change. The interval may be, for example, a grant, a poll, a free interval or an initial-maintenance interval (IMI). The algorithm determines if the interval can be rescheduled to accommodate the detected change and if so reschedules the interval. If the interval cannot be rescheduled to accommodate the detected change, the interval is removed from the schedule. The rescheduling process may be repeated for each of the intervals in the channel schedule.

The rescheduling algorithm may be further operative to deadmit a non-best-effort flow associated with the given interval if the given interval comprises a grant or a poll and the interval cannot be rescheduled to accommodate the detected change.

In accordance with another aspect of the invention, the rescheduling algorithm may be implemented such that flows are never deadmitted as a result of the rescheduling. More specifically, an initial slot boundary may be established for the channel, and upon scheduling of a given interval comprising a grant or poll, the interval may be aligned such that an edge of the interval is spaced a distance from the initial slot boundary that is an integer multiple of a maximum slot size. The size of the interval may then be selected as a value which is at least as large as a largest value of the interval under any valid channel descriptor, and which is a multiple of the maximum slot size. The interval may then subsequently be rescheduled within the distance that is an integer multiple of the maximum slot size.

In an illustrative embodiment of the invention, the channel to be rescheduled is an upstream channel in a DOCSIS-compliant CATV system. The rescheduling techniques in this embodiment may be implemented in an otherwise conventional scheduler within a cable-modem termination system (CMTS) or other processing device of the CATV system.

Advantageously, the rescheduling techniques of the invention in the illustrative embodiment are not only efficient and flexible, but are also service preserving, that is, rescheduling may be implemented without requiring that the corresponding channel ever be taken out of service as a result of the rescheduling.

BRIEF DESCRIPTION OF THE DRAWINGS

FIG. 7 is a table showing the scheduling types that require grants and polls.

FIG. 8 is a table showing scheduled grants and polls for each flow type.

FIG. 9 is a table showing the effect of interval removal on QoS.

FIG. 10 shows an example rescheduling algorithm implemented in the CATV system of FIG. 1A in an illustrative embodiment of the invention.

FIGS. 12A and 12B illustrate the handling of free intervals in conjunction with rescheduling.

FIG. 13 shows an algorithm for handling IMIs in conjunction with rescheduling.

FIG. 14 shows an IMI with minislot boundaries under a new UCD after rescheduling.

FIGS. 15 through 30 illustrate different aspects of a more detailed example implementation of the rescheduling algorithm of FIG. 10.

DETAILED DESCRIPTION OF THE INVENTION

The present invention will be illustrated herein in the context of a CATV communication system in which a plurality of cable modems (CMs) communicate over a CATV network with a cable-modem termination system (CMTS). It should be understood, however, that the present invention, although particularly well-suited for use in this CATV context, is not limited thereto. The techniques of the present invention are more generally suitable for use in any communication system application in which it is desirable to provide improved channel rescheduling in response to a change in one or more channel properties.

Figure 1A:
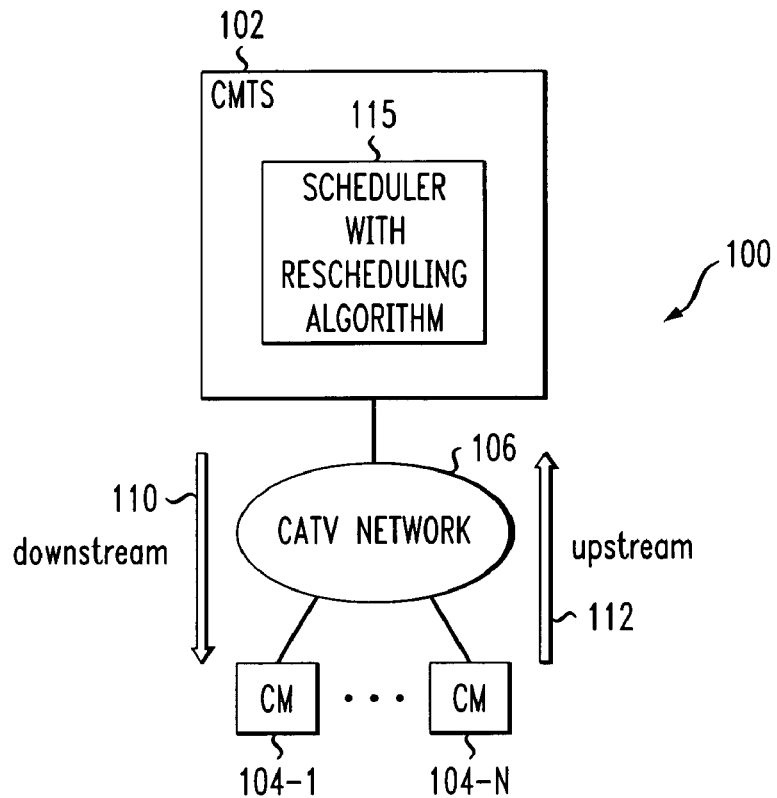
FIG. 1A shows an example CATV communication system in which the present invention is implemented.

FIG. 1A shows an example CATV system 100 in accordance with an illustrative embodiment of the invention. The system 100 includes a CMTS 102 which communicates with a plurality of CMs 104-1, 104-2, . . . 104-N over a CATV network 106. More specifically, the CMTS 102 and the CMs 104 communicate via network 106 in a downstream direction 110 and in an upstream direction 112.

The CMs 104 in the system 100 may be of a conventional design. These and various other conventional aspects of the operation of the CATV system 100 are described in greater detail in, for example, J. Farmer et al., "Modern Cable Television Technology: Video, Voice, & Data Communications," Morgan Kaufmann, January 1999, which is incorporated by reference herein, and in the above-cited DOCSIS specification documents.

In accordance with one aspect of the invention, the CMTS 102 is configured to include a scheduler 115 which provides rescheduling, in the event of a change in at least one property of an upstream channel, utilizing the techniques described herein. The scheduler 115 may be an otherwise conventional scheduler modified to implement a rescheduling algorithm of the type described herein so as to provide rescheduling for upstream channels of the CATV system 100. The present invention in an illustrative embodiment thus provides techniques for rescheduling one or more of the upstream channels of the system 100. More specifically, the invention in an illustrative embodiment provides rescheduling in response to a change in at least one property of an upstream channel.

The rescheduling techniques of the present invention may be implemented at least in part in the form of software that runs in conjunction with an otherwise conventional scheduler in the CMTS 102. The CMTS 102 is thus configured to utilize the techniques of the invention to generate an upstream channel schedule in response to changes in one or more properties of the channel.

Figure 1B:
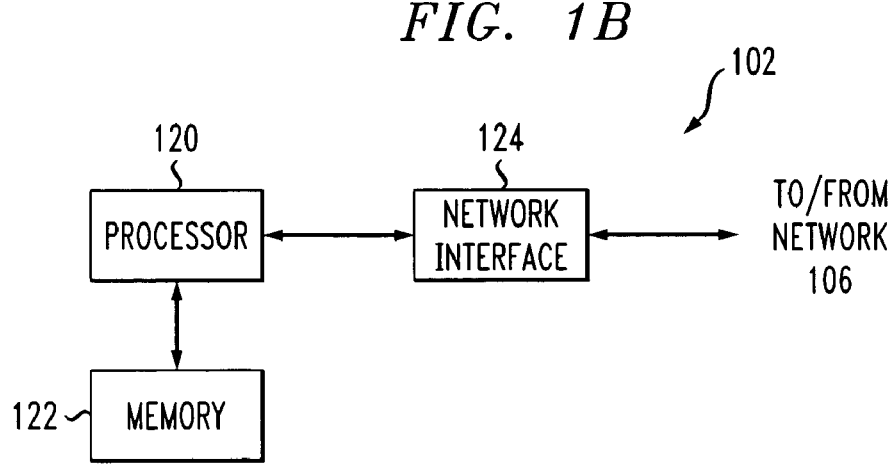
FIG. 1B is a block diagram of a processing device of the FIG. 1A system.

FIG. 1B is a simplified block diagram showing a processor-based implementation of the CMTS 102 in the FIG. 1A system. The CMTS 102 as shown comprises a processor 120 coupled to a memory 122. The device communicates over the network 106 via a network interface 124. Software for implementing the scheduler 115 of CMTS 102 and an associated timing interval alignment technique in accordance with the invention may be stored in memory 122 and executed by processor 120.

The CMTS 102 is an example of what is more generally referred to herein as a "processing device."

The processor 120 may represent a microprocessor, CPU or other processing element of a computer or other processing platform, or portions or combinations of these or other known processing elements.

Similarly, memory 122 may be implemented in a conventional manner, and may represent electronic memory, magnetic memory or other storage devices, or portions or combinations thereof. The present invention is thus not restricted in terms of the particular configuration of the processing device or devices in which it is implemented.

It is to be appreciated that the example arrangements shown in FIGS. 1A and 1B are considerably simplified for illustration purposes, and a given communication system or associated processor-based device configured in accordance with the invention may include different arrangements of elements or other elements not explicitly shown.

The CATV network 106 is assumed in the illustrative embodiment to be a DOCSIS-compliant network. As noted above, such a network utilizes an FDM technique to separate uplink and downlink channels, with each channel generally corresponding to one FDM frequency. During normal operation of the system 100, a given one of the CMs 104 listens on only one downstream channel and transmits on only one upstream channel. However, more than one CM can use a given upstream channel.

Figure 2:
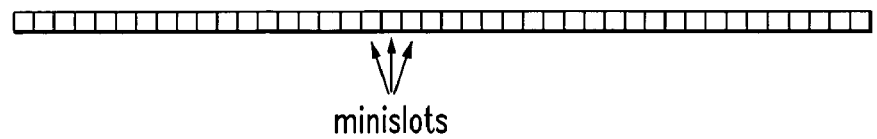
FIG. 2 illustrates upstream channel minislots in the CATV system of FIG. 1A.

Because more than one CM can use an upstream channel, a medium-access-control (MAC) protocol is needed on the upstream channels. The DOCSIS MAC protocol works as follows. First, each upstream channel is time-division multiplexed into a sequence of minislots, as illustrated in FIG. 2. Then, each CMTS schedules all the minislots in all the upstream channels that it services. An upstream schedule specifies exactly which CM (or CMs) may use which minislots, and for what purpose.

Although the invention will be illustrated using DOCSIS minislots of the type shown in FIG. 2, the described techniques are more generally applicable to timing intervals associated with other types of time slots. The term "time slot" as used herein is intended to include without limitation DOCSIS-compliant minislots.

Figure 3:
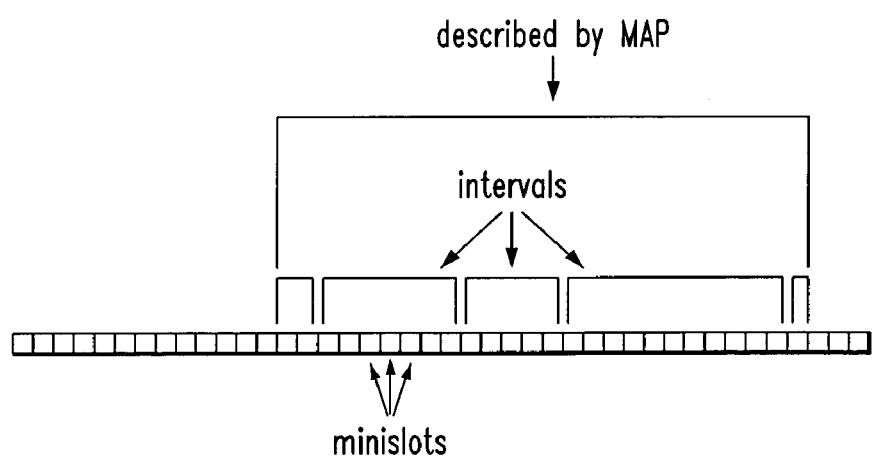
FIG. 3 illustrates the manner in which upstream channel minislots may be arranged into intervals described by MAP messages.

The CMTS 102 logically divides a given upstream channel into a contiguous sequence of intervals, as illustrated in FIG. 3, with each interval comprising a contiguous sequence of minislots. The CMTS assigns to each interval an interval type, which specifies how the CMs may use that interval. In a grant interval, the specified CM may send a data frame to the CMTS. In a request interval, the specified CM or CMs may send a request for a grant. A request interval is also sometimes called a poll.

The DOCSIS standard requires that initial-maintenance intervals (IMIs) in certain sets of upstream channels be aligned. IMIs are used by CMs when the CMs first come on line. A set of aligned channels in accordance with the DOCSIS standard has the property that for each IMI X mapped in any of those channels, all other channels in the set have an IMI that starts and ends at precisely the same time as X. It should be understood, however, that the invention can be used to provide other types of alignment of IMIs or other timing intervals. The terms "align," "aligned," "alignment" and "aligning," and other similar terms utilized herein, should therefore not be construed as requiring any particular alignment precision.

Figure 4:
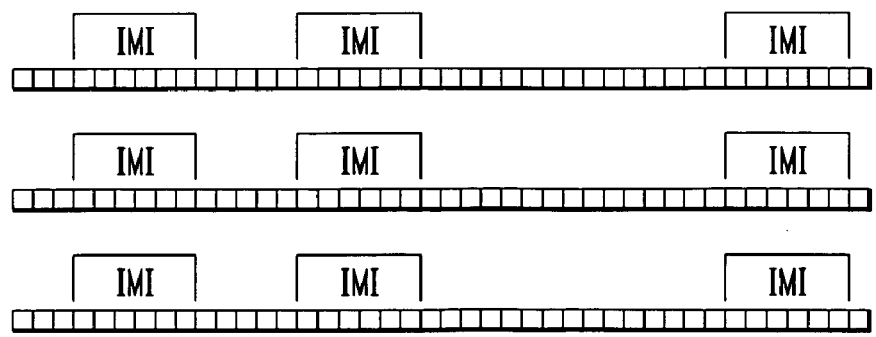
FIG. 4 shows three upstream channels with timing intervals that have been time-aligned in accordance with the techniques of the invention.

FIG. 4 shows a contiguous portion of the minislots for three aligned channels. Note that consecutive IMIs in a channel need not have the same separation. In addition, all IMIs in a channel typically have the same size, which is a function of the maximum distance from the CMTS to any CM that it serves.

Exemplary techniques for aligning IMIs or other timing intervals in a DOCSIS-compliant CATV system or other type of communication system are described in U.S. patent application Ser. No. 10/388,981, filed Mar. 14, 2003 and entitled "Method and Apparatus for Aligning Timing Intervals Across Communication System Channels," which is commonly assigned herewith and incorporated by reference herein.

The CMTS encodes its schedule in a sequence of upstream bandwidth allocation MAP protocol messages, also referred to herein as simply MAPs. Each MAP describes the schedule for some number of contiguous intervals, collectively covering a duration of a few milliseconds, starting at a specified time in the future. MAP generation is an operation that the CMTS typically performs hundreds of times a second and therefore should generally be as fast as possible. The CMTS periodically broadcasts, on the appropriate downstream channels, the latest MAP for each upstream channel.

The DOCSIS protocol generally requires that every upstream channel be synchronized to the CMTS master clock. The CMTS periodically sends, in each downstream channel, the current master-clock time in a sync message. All upstream channels accessible to a given CM must be synchronized to the same clock.

Every upstream channel logically contains one or more unidirectional flows. When a CM wishes to send a data packet or a control message to the CMTS, the CM chooses a flow in which to send the message. Every flow must be admitted before it can be used and deadmitted after it is finished being used.

Every flow has a scheduling type, which constrains how the CMTS can schedule the flow. There are five scheduling types: best effort, unsolicited grant service (UGS), unsolicited grant service with activity detection (UGS/AD), real-time polling service (rtPS), and nonreal-time polling service (nrtPS). A UGS/AD flow can be active, i.e., currently sending data, or inactive. We will call a flow with scheduling type other than best effort a periodic flow or a non-best-effort (NBE) flow.

A standard model of CMTS behavior will now be described with reference to FIGS. 5 and 6. The DOCSIS protocol specifies how a CMTS must behave, not how it must be implemented. In particular, DOCSIS does not specify how a CMTS actually constructs its upstream schedules. Therefore, in order to understand the internal CMTS ramifications of IMI alignment, it is necessary to assume some reasonable model of how a CMTS works. It is believed that the standard model described below is general enough to capture all practical CMTSs that are "correct," that is, fully compliant with the DOCSIS protocol.

Figures 5, 6:
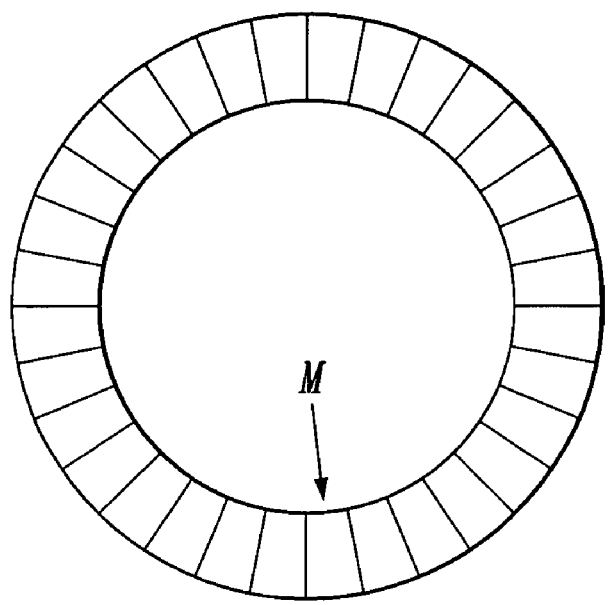
FIG. 5 is a diagram illustrating the schedule associated with a given upstream channel.
FIG. 6 shows a MAP-generation algorithm in accordance with the invention.

In the standard model, a CMTS internally maintains its schedule for a given upstream channel as a cycle of minislots as illustrated in FIG. 5. At any given time, one of the minislots M in the cycle is the next-map minislot, that is, the next minislot to be mapped in the upstream channel. Each of the upstream channels associated with a given CMTS generally has its own cycle of minislots arranged as shown in FIG. 5. A given upstream channel in the illustrative embodiment thus comprises a plurality of cyclically-recurring minislots, and FIG. 5 shows a single cycle of the cyclically-recurring minislots for the given channel. The particular number of minislots shown in this diagram is exemplary only. It should also be appreciated that this diagram is simplified for illustrative purposes.

Now consider what happens when the CMTS generates the next MAP for an upstream channel. In the standard model, the CMTS uses the algorithm shown in FIG. 6, where t denotes the approximate amount of time to be mapped in the upstream channel. Other similar algorithms could be used.

The operation of the FIG. 6 algorithm is as follows. In step 1, the CMTS determines the number n of minislots that the MAP will map. The value of n is chosen such that the value of n is approximately as large as the CMTS wants the MAP to be, and such that advancing the schedule's next-map pointer by n minislots will not land the next-map in the middle of an item.

In step 2, the CMTS advances the next-map minislot M by n minislots. Let S be the contiguous sequence of minislots over which M is advanced. Note that S may contain one or more grants and polls, IMIs and free intervals.

In step 3, the CMTS uses the contents of S to populate the MAP. For each item s in S, the CMTS may decide to copy s into the MAP with or without modification, or leave those minislots temporarily free in the MAP. The rules for what to copy are generally complex, but are effectively determined by the DOCSIS QoS requirements, and are therefore not described in further detail herein.

Finally, in step 4 the CMTS post-processes the MAP, typically to add more items. In particular, the CMTS determines whether any out-of-schedule items should be issued, and if so, the CMTS adds them to the MAP. The implementation of finishMAP is highly CMTS-specific. The standard model places no restrictions on how finishMAP is implemented.

Additional details of the DOCSIS protocol more particularly relating to changes in upstream channel properties will now be described.

A given upstream channel in the DOCSIS protocol is specified by the following properties:

1. Channel ID. The channel ID is a value that uniquely identifies the upstream channel among all channels in the containing MAC domain.

2. Minislot size. The minislot size is the current size of the channel minislots. The legal minislot sizes are 1, 2, 4, 8, 16, 32 and 64 times the minimum legal minislot size $\mu_{min}$.

3. Frequency. The center frequency of the upstream channel.

4. Configuration change count. The configuration change count is used in the upstream-property-changing protocol.

5. Symbol rate. The symbol rate is an example of a modulation characteristic.

6. Preamble pattern. The preamble pattern is another example of a modulation characteristic.

7. Burst descriptors. There is one burst descriptor for each interval type. The burst descriptor for interval type k describes the additional modulation properties that a CM must use when transmitting in a type-k interval.

For each upstream channel that a CMTS serves, the CMTS periodically broadcasts an upstream channel descriptor (UCD) containing all the properties of that upstream. Thus, we will refer to upstream-property changes as UCD changes. However, it should again be emphasized that the described rescheduling techniques are suitable for use with other types of channel properties.

As indicated above, every upstream channel logically contains one or more unidirectional flows, and a given flow in DOCSIS can have one of five scheduling types, namely, best effort, UGS, UGS/AD, rtPS and nrtPS.

FIG. 7 summarizes the rules for when the CMTS issues grants or polls to a flow. For best effort, rtPS and nrtPS flows, the CMTS typically schedules a grant whenever the flow requests one. For UGS flows, the CMTS must schedule periodic grants. For UGS/AD flows, the CMTS must schedule periodic grants when the flow is active. Flows that are rtPS or nrtPS must be periodically polled, UGS flows are never polled, and UGS/AD flows are polled when the flow is inactive. Finally, the CMTS can poll best effort flows whenever it deems appropriate.

Each scheduling type has an associated set of quality-of-service (QoS) parameters. For example, the QoS for a UGS or UGS/AD flow specifies the grant size, specified in bytes. Given the grant size and the UCD, the CMTS can determine the grant size in minislots. The QoS for UGS and UGS/AD flows also specifies the tolerated grant jitter. Every grant for such a flow must fall entirely within the appropriate jitter window.

The size of a poll, in bytes, is the same for all flows. Given the UCD, the CMTS can determine the poll size in minislots.

Each flow actually has two associated QoS sets, namely, an admitted set, which specifies the resources that the CMTS has admitted, and an activated set, which specifies the resources that the flow is currently receiving. The activated set must be a logical subset of the admitted set.

As noted above, in addition to scheduling grants and polls for flows, a CMTS must schedule IMIs. The size of all IMIs is the same, and is specified in units of time. Given the IMI size in time, the CMTS can determine the IMI size in minislots. If two upstream channels u and v are IMI aligned, then for each IMI that the CMTS maps in u, the CMTS must also map an IMI in v that starts and ends at precisely the same time relative to the CMTS clock. Certain properties of an IMI-aligned upstream cannot be changed, namely, the frequency, the symbol rate, the burst descriptor for IMIs, and the start or end time of any scheduled IMI.

In the FIG. 5 model, the schedule for an upstream u must contain all the grants and polls necessary to meet the admitted QoS for all of u's periodic flows. FIG. 7 indicates that these grants and polls include the grants for UGS and UGS/AD flows, and the polls for UGS/AD, rtPS, and nrtPS flows. If u is IMI aligned, as described above, then the model also requires that the schedule contain all of u's IMIs. The foregoing are the items that the model requires in the schedule.

Other CMTSs may also put one or more of the following items into the schedule: the grants for rtPS, nrtPS, and best-effort flows; the polls for best-effort flows; and the IMIs, if the upstream is not IMI aligned. The standard model allows, but does not require, the CMTS to put these items into the schedule. If the CMTS puts one of these items in the schedule, then we say that the CMTS handles that item in-schedule. FIG. 8 summarizes the grants and polls found in a standard-model schedule. Note that polls for UGS flows are not in the schedule because such flows are never polled.

Note also that after scheduling all the grants, polls and IMIs, some of the minislots in the schedule may be free, that is, not contained in any such items.

In the illustrative basic rescheduling algorithm described below, it is necessary to know the effect on QoS of removing a particular item from the schedule. FIGS. 7 and 8 taken together provide this information, which is summarized in FIG. 9. Specifically, removing a scheduled grant for a UGS or UGS/AD flow would violate that flow's QoS, as would removing a scheduled poll for a UGS/AD, rtPS, or nrtPS flow. Removing any other single item would not violate any flow's QoS.

By way of example, with reference to the MAP generation algorithm of FIG. 6, suppose that s is a grant for a UGS flow. If all of s is needed to meet the flow's current activated QoS, then the CMTS will copy s unmodified into the MAP. If, on the other hand, none of s is needed to meet the flow's activated QoS, the CMTS will not copy s into the MAP.

An example of a basic rescheduling algorithm will now be described in detail with reference to FIGS. 10 through 14.

As indicated above, in a standard-model CMTS, an upstream schedule can contain timing intervals in the form of grants, polls, free intervals and IMIs. A UCD change can render illegal the current size or location in the schedule of one or more of these items. If the schedule is illegal, it must be fixed. That is, one or more of the items must be rescheduled or otherwise addressed so as to accommodate the UCD change while still meeting DOCSIS system requirements.

The general problem may be characterized as, given an arbitrary UCD change, finding a new, legal schedule, if one exists, for the same set of flows. It is believed that this problem is NP complete, and more particularly reduces to the well-known bin-packing problem. Hence, we do not attempt to solve the general problem.

Instead, the example basic algorithm operates as shown in FIG. 10. We visit each interval x in the schedule, starting from the interval containing minislot M, and continuing in schedule order. If x is illegal under the new UCD, we attempt to move or resize x in a way that restores its legality. If we cannot fix x, then we remove it from the schedule. If x is a grant or poll for a non-best-effort flow, we also deadmit the flow.

The process of considering a given interval x for possible rescheduling is also referred to herein as "visiting" the interval. An interval is also referred to herein as an "item," such that the FIG. 10 algorithm may be said to involve visiting items in a schedule. Rescheduling an interval so as to accommodate a property change in a manner which does not violate system requirements, e.g., one or more of the above-described DOCSIS requirements, is also referred to herein as "fixing" an interval.

It is to be appreciated that these particular algorithm steps, as well as those of other algorithms described herein, are exemplary only, and not requirements of the invention. Alternative rescheduling algorithms in accordance with the invention may contain only a subset of these steps, may include different steps, or may utilize a different ordering of the steps, or may analyze intervals in a different order. Other variants are also possible.

Even though the example rescheduling algorithm of FIG. 10 may deadmit one or more flows, it is important to note that the algorithm never requires that the upstream be taken out of service, even for a moment, and the algorithm never deadmits best-effort flows. Not deadmitting best-effort flows is important because the presence of at least one best-effort flow from a CM enables that CM to continue sending data to the CMTS.

Although the above-noted advantageous properties are sufficiently service preserving for many practical CMTSs, there may be applications which require a rescheduling algorithm that never deadmits any flows, no matter what their scheduling type. An extension to the basic rescheduling algorithm to be described elsewhere herein achieves that goal, but at the cost of reducing the available bandwidth for periodic flows.

The handling of grants will now be described in detail with reference to FIGS. 11A through 11E.

Figure 11A:
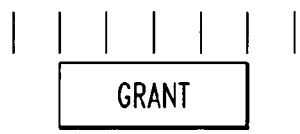
FIGS. 11A through 11E illustrate the handling of grants in conjunction with rescheduling.
Figure 11B:
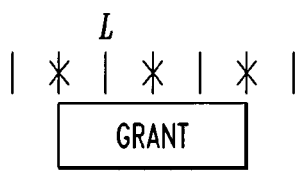

Consider the scheduled grant g shown in FIG. 11A. The vertical lines denote the minislot boundaries under the old UCD. Suppose that new UCD doubles the minislot size, and suppose in particular that the second, fourth, and sixth minislot boundaries disappear, as shown in FIG. 11B. Then g has become dealigned. In FIG. 11B we have marked with an L the leftmost new minislot boundary that falls within g. We will refer to that boundary as the L boundary. If g's old left boundary also falls on a new minislot boundary because, for example, the new UCD does not change the minislot size, then g's old left boundary is also its L boundary.

Figure 11C:
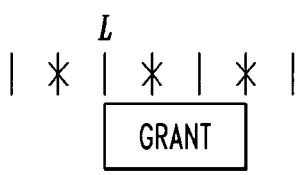

It can be shown that the basic algorithm described above operates such that intervals are what is referred to herein as "left-alignment invariant." This means that when we visit an item, its left edge will have already been realigned to the item's L boundary. Further, its right edge will still be at the position that it had before we began rescheduling. Thus, when we visit g it will look as shown in FIG. 11C.

When we do visit a grant, the grant is handled as follows. Let f be the flow for which g is a grant. If f is best-effort flow, rtPS, or nrtPS, then FIG. 9 shows that removing g from the schedule cannot violate QoS. Hence, we remove g from the schedule.

If f is UGS or UGS/AD, then we calculate (if we haven't done so already) f's grant size under the new UCD. As previously noted, the grant size is specified in terms of bytes, and given the grant size and a UCD, the CMTS can determine the grant size in minislots. Given the grant size in minislots and the same UCD, the CMTS can determine what we will refer to as the grant duration, which is the grant size in units of time.

Let $d_o$ be g's duration when we first visit g (and after its left edge has perhaps been realigned). Let $d_n$ be f's grant duration under the new UCD. There are three cases to consider, depending on whether $d_n$ is equal to, less than, or greater than $d_n$.

If $d_n=d_o$, then g's current duration is correct under the new UCD. It can be seen that g's right edge must be aligned to a new minislot boundary. Further, based on the requirements of DOCSIS QoS, g's placement in the schedule cannot violate any QoS under the new UCD. Hence, we leave g as it is.

Figure 11D:
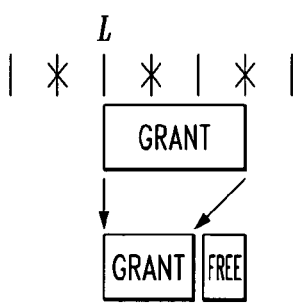

If $d_n<d_o$, then we shrink g, as shown in FIG. 11D. The minislots that used to be in the grant, but no longer are, we make free. Based on the requirements of DOCSIS QoS, this transformation cannot violate any QoS under the new UCD.

Figure 11E:
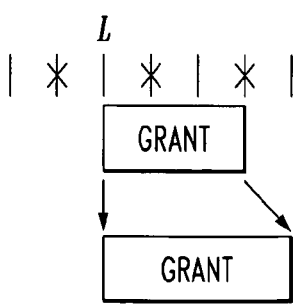

Now suppose that $d_n>d_o$. We might consider expanding g as shown in FIG. 11E. However, such an expansion might cause g to overflow its jitter window. To prevent jitter violation, we could keep track of all jitter windows, and if expanding to the right causes a jitter violation, we could try expanding g to the left, or maybe even a little in both directions. Notice that we can expand g to the left or right only if the intervals to the left or right of g are free. If those intervals are not free, we could try to move those intervals before expanding g. Pretty soon, however, we are attempting to solve the bin-packing problem. Because we do not want to solve NP-complete problems, we take a simpler, but more drastic approach: we remove g from the schedule. Recall that g's flow f is UGS or UGS/AD, and FIG. 9 shows that removal of a grant for such a flow violates QoS. Hence, we also deadmit f. An extension to the basic rescheduling algorithm to prevent such flow deadmission will be described elsewhere herein.

The handling of polls will now be described. Polls are generally handled analogously to grants. Let f be the flow for which poll p has been scheduled. If f is best-effort, then FIG. 9 shows that removing p from the schedule cannot violate QoS. Hence, we remove p from the schedule.

If f has any other scheduling type, then we calculate (if we haven't done so already) the upstream's poll size under the new UCD. As noted above, the size of a poll, in bytes, is the same for all flows, and given a UCD, the CMTS can determine the poll size in minislots. Given the poll size in minislots and the same UCD, the CMTS can determine what we will refer to as the poll duration, which is the poll size in units of time.

Let $d_o$ be p's duration when we first visit p (and after its left edge has perhaps been realigned). Let $p_n$ be the poll duration under the new UCD. There are three cases to consider, depending on whether $d_n$ is equal to, less than, or greater than $d_n$.

If $d_n=d_o$, then p's current duration is correct under the new UCD. It can be seen that p's right edge must be aligned to a new minislot boundary. Further, based on the requirements of DOCSIS QoS, p's placement in the schedule cannot violate any QoS under the new UCD. Hence, we leave p as it is.

If $d_n<d_o$, then we shrink p. Based on the requirements of DOCSIS QoS, this transformation cannot violate any QoS under the new UCD.

Finally, if $d_n>d_o$, we remove p from the schedule. Recall that p's flow f is other than best-effort, and FIG. 9 shows that removal of a poll for such a flow violates QoS. Hence, we also deadmit f. Again, an extension to the basic rescheduling algorithm to prevent flow deadmission will be described elsewhere herein.

The handling of free intervals will now be described with reference to FIGS. 12A and 12B.

Consider the free interval shown in FIG. 12A, which we will refer to as free interval r. Notice that even free intervals satisfy the left-alignment invariant. The only thing that can possibly be wrong with r under the new UCD is that r's right edge is unaligned. To fix r, we could move its right edge toward either the left or the right, to the nearest new minislot boundary. Notice that moving r's right edge also has the effect or moving the following interval's left edge. If that following interval z is a grant or poll, then moving r's right edge to the left runs the risk of causing z to overflow its jitter window. Hence, we move r's right edge to the right, as shown in FIG. 12B.

Notice that it is possible (although highly unlikely) that there are one or more complete intervals in the region between r's old and new right boundaries. If so, we remove those intervals and, if necessary, deadmit their associated flows.

The manner in which IMIs are handled will now be described with reference to FIGS. 13 and 14.

How IMIs are handled depends on whether the upstream is IMI-aligned and whether the CMTS is doing in-schedule IMIs. If the CMTS is not doing in-schedule IMIs, then we will never encounter an IMI during the rescheduling algorithm, and we need not worry about them. If the CMTS is doing in-schedule IMIs and the upstream is not IMI aligned, then we handle IMIs using the algorithm shown in FIG. 13. It should be noted that this IMI handling algorithm is used in conjunction with the basic rescheduling algorithm of FIG. 10, and is not an alternative or replacement for the FIG. 10 algorithm.

With reference to FIG. 13, first we remove all IMIs from the schedule, as indicated in line 1. Then in line 2 we reschedule everything other than IMIs. Finally, in line 3 we add IMIs back into the schedule. Note that line 3 of this algorithm could theoretically run into trouble in that we might discover that we can no longer fit the necessary IMIs into the schedule. However, because DOCSIS places so few restrictions on when the IMIs of a non-IMI-aligned upstream are transmitted, line 3 in practice generally always succeeds.

Now suppose that the CMTS is doing in-schedule IMIs and the upstream is IMI aligned. Consider the IMI shown in FIG. 14. This IMI will be referred to as IMI x. As noted previously, it is not legal to change the start or end time of any IMI for an IMI-aligned upstream. Hence, if the new UCD dealigns either side of x, then the new UCD is illegal. The more detailed example rescheduling algorithm to be presented below detects this class of error. Suppose that the new UCD does not dealign x or any other IMI. Because the UCD does not specify the IMI size, x's size, in units of time, remains correct, and so we leave x alone.

A straightforward analysis shows that this algorithm runs in time O(size), where size in this context denotes the size of a schedule. The algorithm uses O(1) space, not counting the space needed for the schedule. It can also be seen that the algorithm does not adversely affect any other CMTS performance measure. In particular, the speed of MAP generation is not affected by rescheduling.

The above-noted enhancement to the basic rescheduling algorithm to prevent flow deadmission will now be described.

As indicated previously, although the example basic rescheduling algorithm may deadmit one or more flows, an enhancement to that algorithm makes it possible to completely prevent the occurrence of flow deadmission during rescheduling. The cost associated with this enhancement is a reduction in the amount of bandwidth available for periodic flows.

The enhancement operates as follows. Let $\mu_{max}$ be the maximum legal minislot size. When we initially schedule the upstream, we designate an arbitrary minislot boundary B as the base minislot boundary. Then, whenever we schedule a grant or poll x, we do the following. First, we increase the size of x to the smallest value s that satisfies both the following:

1. The value s is the largest size that x could ever have under any legal UCD.

2. The value s is a multiple of $\mu_{max}$.

Second, when we insert x into the schedule, we align the left edge of x at a minislot boundary whose distance from B is a multiple of $\mu_{max}$. The remainder of the enhanced algorithm is a straightforward extension of the basic algorithm previously described, and will be further described in conjunction with an example of a more detailed implementation below.

The enhanced algorithm can provide substantial reductions in the effective bandwidth available in the schedule, which in practice decreases the bandwidth available to periodic flows. This enhanced algorithm does not, however, reduce the upstream's total effective bandwidth. A CMTS implementor must decide whether the decrease in bandwidth for periodic flows is worth the resulting increase in service preservation.

A more detailed implementation of the basic rescheduling algorithm of FIG. 10 will now be described with reference to FIGS. 15 through 30.

FIG. 15 shows the rescheduling algorithm. The arguments of the algorithm reschedule are the upstream u whose UCD we wish to change, and the change A itself. First we check on line 1 whether the proposed change is legal; if not, we return an error. If the change is legal, we fix the upstream's schedule on line 3. The function fixSchedule returns the set of flows that need deadmission, and on lines 4 and 5 we deadmit those flows. The act of deadmitting a flow removes any intervals for that flow that might remain in the schedule. After reschedule completes, the CMTS can begin transmitting the new UCD, although it should be noted that other UCD-dependent data may need to be adjusted.

The determination of what constitutes a legal UCD change is specified by DOCSIS. As shown in algorithm isLegal in FIG. 16, it is never legal to change an upstream's channel ID. Conversely, it is always required to change the configuration-change count. The only remaining illegalities concern IMI-aligned upstreams. Lines 5 through 7 implement the IMI-related restrictions enumerated elsewhere herein. Finally, lines 8 through 11 implement the dealignment restriction previously described in conjunction with FIG. 14.

The function isSlotAlignedAfter, shown in FIG. 17, returns "true" if the given interval x would be minislot aligned after applying the UCD change. Lines 1 and 2 determine the scale of the current and new minislot sizes relative to $\mu_{min}$. On line 3 we calculate the distance s from M(as shown in FIG. 5) to x in units of $\mu_{min}$. If s is not a multiple of the new scale, then x will not align after the UCD change, and so we return "false" on line 6. On line 7 we calculate the size t of x in unites of $\mu_{min}$. If t is not a multiple of the new scale, then x will not align after the UCD change, and so we return "false" on line 9. Otherwise, x will align, and we return "true" on line 10.

To fix the upstream's schedule, we use the algorithm shown in FIG. 18. As explained previously herein, if the upstream is not IMI aligned, we first remove all scheduled IMIs. Then on line 3 we convert the schedule from a cycle to a linear series of intervals by cutting the cycle at the left minislot boundary of M. If, before the cut, M is not the first minislot in its containing interval MI, then MI must be a free interval, in which case we cut MI into two free intervals. Note that after the cut, M is the first minislot in the linear series, pred is nil, and succ z is nil, where z is the predecessor of MI before the cut.

The process of fixing the schedule can be made easier if we next convert the schedule's minislot size from units of $\mu_{cur}$ to units of $\mu_{min}$; we do that on line 4. On line 5 we initialize the set of flows that need deadmission. On lines 6 through 8 we iterate through all the intervals starting at MI, fixing each interval as we go. The function fixInterval returns the next interval in the schedule that needs fixing. After all intervals are fixed, we convert the schedule to units of $\mu_{new}$. On line 10 we rejoin the ends of the schedule to re-form a cycle. Next, if u is not IMI aligned and the CMTS does in-schedule IMIs, we schedule new IMIs on line 12. Finally, we return the set of flows that need deadmission.

To convert the schedule from units of $\mu_{cur}$ to units of $\mu^{min}$, we use the algorithm shown in FIG. 19. We first compute the scale of the current minislot size relative to $\mu_{min}$. We then calculate the offset and size of each interval in units of $\mu_{min}$. The size of x is the current size times the scale; the offset of x is the (adjusted) offset of x's predecessors plus the (adjusted) size of p. Note that the identifiers as used in this context is distinct from its usage elsewhere herein.

The algorithm to convert from units of $\mu_{min}$ to units of $\mu_{new}$ is analogous, and is shown in FIG. 20. Notice that when converting to a larger minislot size we must divide on line 3 instead of multiplying.

To fix a schedule interval x, we use the algorithm shown in FIG. 21. If x is a free interval, grant, or poll, we call the appropriate function. If x is an IMI, then the upstream must be IMI aligned (otherwise we would have removed this IMI earlier in fixSchedule). Further, x must be minislot aligned because the function isLegal earlier returned "true." Hence, x needs no fixing, and so we simply return the next interval to be fixed. Finally, if x is some other type of interval, we turn x into a free interval and then fix it.

To fix a free interval x, we use the algorithm shown in FIG. 22. The function fixFreeInterval relies on the fact that the left-alignment invariant described previously is true for x.

The right boundary of x, however, might not be aligned to a new minislot boundary, as illustrated in FIG. 23. To align x, we extend its right boundary by e, the distance between its current right boundary and the next new minislot boundary. Note that this extension effects the transformation shown in FIG. 12B. As indicated in the FIG. 22 algorithm, we call the function nAdditionalUMinNeededToSlotAlign, which returns the size of e in units of $\mu_{min}$.

Extending the right boundary of x is complicated by the fact that e might span more than one interval. For example, in FIG. 24 extension of x spans intervals $x_1$, $x_2$, and part of $x_3$. In this particular case to extend x we shrink $x_1$ and $x_2$ to zero minislots and we partially shrink $x_3$. Lines 2 through 11 of fixFreeInterval perform the extension correctly in all possible scenarios. On line 12 we save a pointer to the next interval to be fixed. On line 13 we check whether x itself has zero minislots, in which case we remove it from the schedule on line 14.

The algorithm of FIG. 25 returns e in units of $\mu_{min}$.

To fix a grant or poll x, we use the algorithm shown in FIG. 26. The function fixGrantOrPoll relies on the fact that the left-alignment invariant is true for x. The function fixGrantOrPoll begins by checking, on line 2, whether the corresponding flow has already been marked for deadmission. If so, we turn x into a free interval and then fix it. Otherwise, we set n to the size, in units of $\mu_{min}$, that this grant or poll should be after applying the UCD change. If n is smaller than x, then we shrink x and return the next interval to be fixed. If n is bigger than x, then on lines 12 and 13 we turn x into a free interval and then fix it. We also call removalViolatesQoS on line 10 to determine whether removal of this grant or poll violates any QoS. If so, we add f to the deadmission set D. Any grants or polls for f that occurred earlier in the schedule will be removed when we deadmit f.

The function newSize is shown in FIG. 27. A more detailed implementation of newSize can be determined in a straightforward manner from the DOCSIS specifications, and is therefore not described herein.

The function removalViolatesQoS, shown in FIG. 28, implements the determinations associated with FIG. 7.

The function shrink, shown in FIG. 29, implements the transformation shown in FIG. 11D. The argument n is the new interval size, in units of $\mu_{min}$. On line 2 we shrink x by the appropriate number m of minislots. If there is a free interval y after x, then we add those m minislots to y on lines 5 and 6. Otherwise we insert after x a new free interval of m minislots, on lines 9 and 10.

To make an interval x free, we use the algorithm shown in FIG. 30. On line 1 we change x's type to free. Then we check, on line 3, whether there is a free interval y after x. If so, we merge y into x and remove y from the schedule. Finally, we check, on line 8, whether there is a free interval y before x. If so, we merge y into x and remove y from the schedule. Notice that makeFree never removes x from the schedule. The various functions that call makeFree rely on this property.

The above-described detailed implementation can also be enhanced in the manner indicated previously so as to completely prevent the occurrence of flow deadmission during rescheduling. More specifically, when we initially schedule the upstream, we designate an arbitrary minislot boundary B as the base minislot boundary. Then, whenever we schedule a grant or poll x, we start x at a minislot boundary whose distance from B is a multiple of $\mu_{max}$. Further, if the size of x is not a multiple of $\mu_{max}$, we schedule, immediately after x, an interval s of minislots such that the size of x plus the size of s is a multiple of $\mu_{max}$. We designate s as free, but usable only during a UCD change.

When a UCD change occurs, we cut the schedule at B instead of M, as indicated in line 3 of fixSchedule in FIG. 18. Because of how we scheduled x, the UCD change cannot dealign the start of x. The UCD change can, however, dealign the end of x. If the end of x is dealigned, we use some or all of the space in s to extend x to the next new minislot boundary.

It should be emphasized that the detailed implementation of the rescheduling algorithm as described in conjunction with FIGS. 15 through 30 is offered by way of illustrative example only, and the particular operations associated therewith should not be viewed as requirements of the invention.

In the illustrative embodiments above, an upstream channel is rescheduled in response to a UCD change. However, in a typical CMTS, the upstream schedule may not be the only thing that the CMTS may need to adjust in response to a UCD change. In general, the CMTS should adjust every datum that depends, directly or indirectly, on any changed value contained in the UCD. This process may be complicated by the fact that different types of CMTSs often maintain different sets of UCD-dependent data. Nonetheless, the adjustment of UCD-dependent data other than the upstream channel schedule can be performed using conventional techniques well-known to those skilled in the art.

Advantageously, the rescheduling techniques of the present invention as implemented in the CATV system 100 in the illustrative embodiments are efficient, flexible and service preserving. The techniques are efficient in that they can execute quickly and require little memory space, and thus do not adversely affect any other CMTS performance measure. The techniques are flexible in that they allow the CMTS to perform any legal property change at any time, even on upstream channels that are widely regarded as difficult to schedule. Finally, the techniques are service preserving in that they never require that the upstream channel be taken out of service, and never deadmit best-effort flows. As indicated above, the basic rescheduling algorithm can also be extended so as to never deadmit any flows.

The above-described embodiments of the invention are intended to be illustrative only. For example, although described in conjunction with rescheduling in response to changes in one or more properties of a cable-modem upstream channel in a CATV system, the techniques of the invention are more broadly applicable to rescheduling other types of channels in other communication system applications. The system components described herein can be implemented using otherwise conventional arrangements of hardware, software, firmware, or combinations thereof. As noted above, the illustrative rescheduling algorithms described herein may be implemented at least in part in the form of one or more software programs which are configured to run on one or more computers or other types of processing devices comprising or otherwise associated with a CMTS or other communication system element. Also, the particular steps in the example rescheduling algorithms may be varied. These and numerous other alternative embodiments within the scope of the following claims will be readily apparent to those skilled in the art.

What is claimed is:

1. A method for rescheduling one or more timing intervals associated with a channel of a communication system, the channel comprising a plurality of cyclically-recurring time slots, the timing intervals each comprising one or more of the time slots, the method comprising the steps of:
   detecting a change in at least one property of the channel;
   identifying a given one of the timing intervals, within a schedule for the channel, that violates a system requirement in view of the detected change;
   for the given timing interval, determining if the interval can be rescheduled to accommodate the detected change and if so rescheduling the interval; and
   if the interval cannot be rescheduled to accommodate the detected change, removing the interval from the schedule;
   wherein the channel comprises one or more flows, each of the flows having a designated scheduling type.

2. The method of claim 1 wherein the change in at least one property of the channel comprises a change in a size of the time slots.

3. The method of claim 1 wherein the change in at least one property of the channel comprises a change in a modulation characteristic of the channel.

4. The method of claim 1 wherein the given interval comprises one of a grant, a poll, a free interval, and an initial-maintenance interval.

5. The method of claim 1 further including the step of deadmitting a non-best-effort flow associated with the given interval if the given interval comprises a grant or a poll and the interval cannot be rescheduled to accommodate the detected change.

6. The method of claim 1 wherein rescheduling of the given interval is implemented without requiring that the corresponding channel ever be taken out of service as a result of the rescheduling.

7. The method of claim 1 wherein rescheduling of the given interval is implemented such that a best-effort flow associated with the given channel is never deadmitted as a result of the rescheduling.

8. The method of claim 1 wherein rescheduling of the given interval is implemented such that the given interval is left-alignment invariant.

9. The method of claim 1 wherein the given interval has a duration $d_0$ prior to the property change, and rescheduling of the given interval includes the steps of:
   if the flow associated with the given interval is of a particular predetermined scheduling type and the given interval is of a particular predetermined interval type, removing the given interval from the schedule; and
   otherwise determining a new duration $d_n$ of the given interval taking into account the property change, and handling the given interval as follows depending on the relative values of $d_n$ and $d_0$:
   if $d_n = d_0$, leaving the given interval in the schedule;
   if $d_n < d_0$, shrinking the given interval by reducing its duration; and
   if $d_n < d_0$, removing the given interval from the schedule.

10. The method of claim 1 wherein the given interval comprises a free interval, and rescheduling of the free interval is configured such that a right edge of the free interval is moved to the right.

11. The method of claim 1 wherein the communication system comprises a DOCSIS-compliant CATV system, and the channel comprises an upstream channel of the system.

12. The method of claim 1 wherein the time slots comprise minislots defined in accordance with the DOCSIS protocol.

13. A method for rescheduling one or more timing intervals associated with a channel of a communication system, the channel comprising a plurality of cyclically-recurring time slots, the timing intervals each comprising one or more of the time slots, the method comprising the steps of:
   detecting a change in at least one property of the channel;
   identifying a given one of the timing intervals, within a schedule for the channel, that violates a system requirement in view of the detected change
   for the given timing interval, determining if the interval can be rescheduled to accommodate the detected change and if so rescheduling the interval; and
   if the interval cannot be rescheduled to accommodate the detected change, removing the interval from the schedule;
   wherein the change in at least one property of the channel comprises a change in a channel descriptor of the channel.

14. A method for rescheduling one or more timing intervals associated with a channel of a communication system, the channel comprising a plurality of cyclically-recurring time slots, the timing intervals each comprising one or more of the time slots, the method comprising the steps of:
   detecting a change in at least one property of the channel;
   identifying a given one of the timing intervals, within a schedule for the channel, that violates a system requirement in view of the detected change;
   for the given timing interval, determining if the interval can be rescheduled to accommodate the detected change and if so rescheduling the interval; and
   if the interval cannot be rescheduled to accommodate the detected change, removing the interval from the schedule;
   wherein the one or more intervals comprise initial-maintenance intervals not aligned with corresponding initial-maintenance intervals of one or more other channels of the system, and further comprising the steps of, responsive to the property change, removing all of the initial-maintenance intervals from the schedule, rescheduling one or more remaining intervals, and adding the previously-removed initial-maintenance intervals back into the schedule.

15. A method for rescheduling one or more timing intervals associated with a channel of a communication system, the channel comprising a plurality of cyclically-recurring time slots, the timing intervals each comprising one or more of the time slots, the method comprising the steps of:
   detecting a change in at least one property of the channel;
   identifying a given one of the timing intervals, within a schedule for the channel, that violates a system requirement in view of the detected change;

for the given timing interval, determining if the interval can be rescheduled to accommodate the detected change and if so rescheduling the interval; and if the interval cannot be rescheduled to accommodate the detected change, removing the interval from the schedule;

wherein an initial slot boundary is established for the channel, and further wherein upon scheduling of the given interval, the given interval comprising a grant or poll, the interval is aligned such that an edge of the interval is spaced a distance from the initial slot boundary that is an integer multiple of a maximum slot size.

16. The method of claim 15 wherein the size of the given interval is selected as a value which is at least as large as a largest value of the interval under any valid channel descriptor, and which is a multiple of the maximum slot size.

17. The method of claim 15 wherein the given interval is rescheduled within the distance that is an integer multiple of the maximum slot size.

18. An apparatus for rescheduling one or more timing intervals associated with a channel of a communication system, the channel comprising a plurality of cyclically-recurring time slots, the timing intervals each comprising one or more of the time slots, the apparatus comprising:

a memory; and a processor coupled to the memory;

the processor being operative to control operations associated with rescheduling of one or more of the timing intervals, the operations including detecting a change in at least one property of the channel; identifying a given one of the timing intervals, within a schedule for the channel, that violates a system requirement in view of the detected change; for the given timing interval, determining if the interval can be rescheduled to accommodate the detected change and if so rescheduling the interval; and if the interval cannot be rescheduled to accommodate the detected change, removing the interval from the schedule; wherein the channel comprises one or more flows, each of the flows having a designated scheduling type.

19. A computer-readable medium storing one or more software programs for use in rescheduling one or more timing intervals associated with a channel of a communication system, the channel comprising a plurality of cyclically-recurring time slots, the timing intervals each comprising one or more of the time slots, the system being operative to detect a change in at least one property of the channel, wherein the one or more software programs when executed in a processing device of the system implement the steps of:

identifying a given one of the timing intervals, within a schedule for the channel, that violates a system requirement in view of the detected change;

for the given timing interval, determining if the interval can be rescheduled to accommodate the detected change and if so rescheduling the interval; and if the interval cannot be rescheduled to accommodate the detected change, removing the interval from the schedule;

wherein the channel comprises one or more flows, each of the flows having a designated scheduling type.

* * * * *

UNITED STATES PATENT AND TRADEMARK OFFICE
CERTIFICATE OF CORRECTION

| | | |
|---|---|---|
| PATENT NO. | : 7,301,908 B2 | Page 1 of 1 |
| APPLICATION NO. | : 10/391982 | |
| DATED | : November 27, 2007 | |
| INVENTOR(S) | : M.D. Carroll | |

It is certified that error appears in the above-identified patent and that said Letters Patent is hereby corrected as shown below:

In the claims:

Claim 9, column 16, line 4, delete "<" and insert -->--

Signed and Sealed this

Twenty Second Day of April, 2008

JON W. DUDAS
*Director of the United States Patent and Trademark Office*